United States Patent
Gris et al.

(10) Patent No.: US 9,952,043 B2
(45) Date of Patent: Apr. 24, 2018

(54) DEVICE AND METHOD FOR IDENTIFYING A CYCLIC MOVEMENT AND CORRESPONDING COMPUTER PROGRAM

(71) Applicants: Commissariat a l'energie atomique at aux ene alt, Paris (FR); MOVEA, Grenoble (FR)

(72) Inventors: Florence Gris, Tullins (FR); Pierre Jallon, Grenoble (FR)

(73) Assignees: Commissariat à l'énergie atomique et aux énergies alternatives, Paris (FR); Movea, Grenoble (FR)

( * ) Notice: Subject to any disclaimer, the term of this patent is extended or adjusted under 35 U.S.C. 154(b) by 658 days.

(21) Appl. No.: 14/386,549

(22) PCT Filed: Mar. 18, 2013

(86) PCT No.: PCT/FR2013/050568
§ 371 (c)(1),
(2) Date: Sep. 19, 2014

(87) PCT Pub. No.: WO2013/140075
PCT Pub. Date: Sep. 26, 2013

(65) Prior Publication Data
US 2015/0073746 A1 Mar. 12, 2015

(30) Foreign Application Priority Data
Mar. 20, 2012 (FR) .................... 12 52493

(51) Int. Cl.
*G01B 21/00* (2006.01)
*G06K 9/00* (2006.01)
*G06F 17/18* (2006.01)

(52) U.S. Cl.
CPC ............ *G01B 21/00* (2013.01); *G06F 17/18* (2013.01); *G06K 9/00335* (2013.01)

(58) Field of Classification Search
CPC ............................ G06K 9/6297; A63B 69/00
(Continued)

(56) References Cited

U.S. PATENT DOCUMENTS

| 2010/0210975 A1 | 8/2010 | Anthony et al. |
| 2012/0054133 A1 | 3/2012 | Jallon |

FOREIGN PATENT DOCUMENTS

| FR | 2 943 554 | 10/2010 |
| FR | 2 964 223 | 3/2012 |

(Continued)

OTHER PUBLICATIONS

His-Lin Chen, et al., "A Hidden Markov Model-Based Approach for Recognizing Swimmer's Behaviors in Swimming Pool", Proceedings of the Ninth International Conference on Machine Learning and Cybernetics, Qingdao, pp. 2459-2465, (Jul. 11-14, 2010) XP031759889.

(Continued)

*Primary Examiner* — Lam Nguyen
(74) *Attorney, Agent, or Firm* — Oblon, McClelland, Maier & Neustadt, L.L.P.

(57) ABSTRACT

A device identifying a cyclic movement type of a physical system from a set of possible cyclic movements types includes: a movement sensor providing an observation data sequence concerning the physical system; a storage storing at least one statistical hidden-state Markov model; and a computer programmed to analyze the observation data sequence and select one cyclic movement type based on the stored statistical model. The storage includes least one statistical hidden-state Markov model for each possible cyclic movement type and the computer is programmed to analyze compatibility of the observation data sequence with each possible cyclic movement type based on the statistical model associated with this cyclic movement type. The (Continued)

Figure 1:
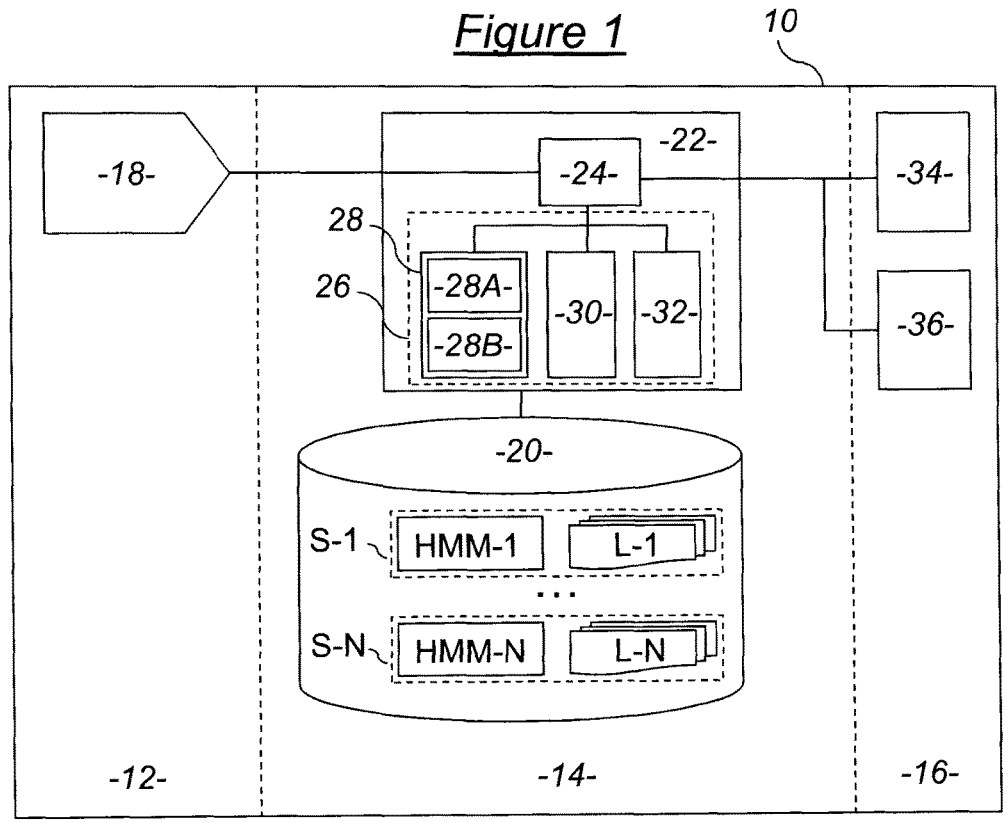

computer is further programmed to provide a sequence of hidden states of the statistical model associated with the selected cyclic movement type, based on the observation data sequence and the statistical model associated with the selected cyclic movement type.

10 Claims, 2 Drawing Sheets

(58) Field of Classification Search
USPC .......................................... 702/141; 706/12
See application file for complete search history.

(56) References Cited

FOREIGN PATENT DOCUMENTS

| | | |
|---|---|---|
| WO | 2010 083562 | 7/2010 |
| WO | 2010 090867 | 8/2010 |

OTHER PUBLICATIONS

"Chapter 9: Context-Dependent Classification", Pattern Recognition, 4$^{th}$ Edition, pp. 521-565, (Jan. 1, 2009) XP002691024.

Lawrence R. Rabiner, "A Tutorial on Hidden Markov Models and Selected Applications in Speech Recognition", Proceedings of the IEEE, vol. 77, No. 2, pp. 257-286, (Feb. 1, 1989) XP002550447.

Arash Ali Amini, et al., "HMM Based Video Classification Using Simple Features", Total 11 Pages, (Jan. 1, 2008) XP002691026.

O. Thomas, et al., "Wearable-Sensor Activity Analysis Using Semi-Markov Models with a Grammar", Preprint Submitted to Elsevier, Total 15 Pages, (Nov. 5, 2008) XP002691025.

Volker Kruger, "Chapter 3: Recognition of Action as a Bayesian Parameter Estimation Problem over Time", Human Motion. Understanding, Modelling, Capture and Animation, pp. 57-79, (Jan. 1, 2008) XP002691033.

International Search Report dated May 27, 2013 in PCT/FR13/050568 Filed Mar. 18, 2013.

French Search Report dated Jan. 28, 2013 in French Application No. 1252493 Filed Mar. 20, 2012.

DEVICE AND METHOD FOR IDENTIFYING A CYCLIC MOVEMENT AND CORRESPONDING COMPUTER PROGRAM

This invention relates to a device for identifying a type of cyclic movement among a set of possible types of cyclic movements of a physical system observed by at least one movement sensor. It also relates to a corresponding method and computer program.

It applies to the technical domain of movement detection and recognition.

"Physical system" refers to any system producing a physical output observable by a sensor, with the system being assumed a priori to be capable of reproducing a predetermined number of cyclic movements modeled by the identification device.

The physical system observed may, for example, be an animated object capable of being driven according to a cyclic movement to be identified, or monitored in order to detect possible abnormalities, using one or more sensors.

It can also be a person or an animal engaging in a movement (walking, running, swimming, etc.) involving a series of cyclic sub-movements. According to the sensor(s) used, the detectable cyclic movements are variable and there are multiple applications.

The invention relates more precisely to a device for identifying a type of cyclic movement from a set of possible types of cyclic movements of a physical system observed by at least one movement sensor comprising:
  at least one movement sensor for providing a sequence of observation data concerning the physical system,
  means for storing at least one statistical hidden-state Markov model,
  a computer, connected to the sensor and to the storage means, programmed to analyze the observation data sequence and select one of the possible types of cyclic movements on the basis of the stored statistical model.

Such a device is described in the French patent application published under number FR 2 943 554. In this document, the cyclic movement observed is a swimming activity. The movement sensor has at least one axis of measurement and is worn by a user. The computer is more precisely programmed to analyze a sequence of observation data and to identify the type of swimming performed by the user over time using a single statistical Markov model with N hidden states corresponding respectively to N identifiable swimming strokes.

With this type of device, the identification of the swimming stroke is possible but is fairly basic. In particular, for the same swimming stroke, different alternatives can be performed by the same person or by different people. However, the model applied in this document does not make it possible to more precisely qualify the swimming stroke observed so that such alternatives cannot be detected a priori, unless the number of hidden states in the statistical model used is multiplied by modeling, a priori, these different alternatives, thus also increasing the risk of detection errors.

It may thus be desirable to provide a cyclic movement identification device that makes it possible to overcome at least some of the aforementioned problems and constraints while taking advantage of a Bayesian analysis by hidden-state Markov modeling.

A device for identifying a cyclic movement among a set of possible cyclic movements of a physical system observed by at least one movement sensor is therefore proposed, comprising:
  at least one movement sensor for providing a sequence of observation data concerning the physical system,
  means for storing at least one statistical hidden-state Markov model,
  a computer, connected to the sensor and to the storage means, programmed to analyze the sequence of observation data and select one of the possible cyclic movements on the basis of the stored statistical model,
wherein:
  the storage means comprise at least one statistical hidden-state Markov model for each possible cyclic movement,
  the computer is programmed to analyze a compatibility of the observation data sequence with each possible cyclic movement on the basis of the statistical model that is associated with this cyclic movement,
  the computer is also programmed to provide a sequence of hidden states of the statistical model associated with the selected cyclic movement, on the basis of the observation data sequence and the statistical model associated with the selected cyclic movement.

Thus, instead of having a single Markov model with N hidden states corresponding to the N possible cyclic movements as taught by the patent application FR 2 943 554, a device according to the invention provides at least N hidden-state Markov models for identifying the N cyclic movements. The modeling is therefore more detailed because then the hidden states of the same Markov model can model a plurality of components of the same cyclic movement. By also providing a sequence of hidden states of the statistical model associated with the selected cyclic movement, on the basis of the observation data sequence obtained from the sensor, a detailed time-based analysis of the identified movement and the components thereof is available.

Optionally, each statistical hidden-state Markov model associated with a possible cyclic movement is a cyclic model represented by a directed graph in which a directed cycle of hidden states is imposed.

Also optionally, each hidden state of each statistical model of the storage means corresponds to a predetermined sub-movement of the cyclic movement with which this statistical model is associated.

Also optionally, for each statistical model:
  a hidden state corresponding to a sub-movement for starting the cyclic movement with which this statistical model is associated is represented by
  a node of the corresponding directed graph located upstream of said directed cycle, and
  a hidden state corresponding to a sub-movement for stopping the cyclic movement with which this statistical model is associated is represented by a node of the corresponding directed graph located downstream of said directed cycle.

A method for identifying a cyclic movement among a set of possible cyclic movements of a physical system observed by at least one sensor is also proposed, comprising:
  the reception of a sequence of observation data concerning the physical system, provided by at least one sensor,
  the selection by a computer of one of the possible cyclic movements by analysis of the observation data sequence on the basis of at least one statistical hidden-state Markov model stored in the memory,
wherein:
  at least one statistical hidden-state Markov model for each possible cyclic movement is stored in the memory,
  the selection is made by analysis of a compatibility of the observation data sequence with each possible cyclic movement on the basis of the statistical model associated with this cyclic movement, the identification method also comprising the provision of a sequence of hidden states of the statistical model associated with the selected cyclic movement, on the basis of the observation data sequence and the statistical model associated with the selected cyclic movement.

Optionally, the selection comprises a comparison of probabilities related to the possible cyclic movements, knowing the observation data sequence, with the probabilities being estimated on the basis of the stored statistical models.

Also optionally, the provision of said sequence of hidden states is performed by applying the Viterbi algorithm.

Also optionally, the identification method as defined above also comprises the computation of statistical or counting parameters of said provided hidden state sequence.

Also optionally, as each statistical hidden-state Markov model associated with a possible cyclic movement is a cyclic model in which a directed cycle of hidden states is imposed, the computed statistical or counting parameters comprise at least one element of the set consisting of a number of hidden-state cycles in said provided hidden-state sequence, durations of each cycle, an average of the durations of each cycle, a variance of the durations of each cycle and a duration of a break in a cycle.

Finally, a computer program capable of being downloaded from a communication network and/or recorded on a computer-readable medium and/or capable of being executed by a processor, including instructions for executing steps of an identification method as defined above, when said program is executed on a computer, is also proposed.

Figure 2:
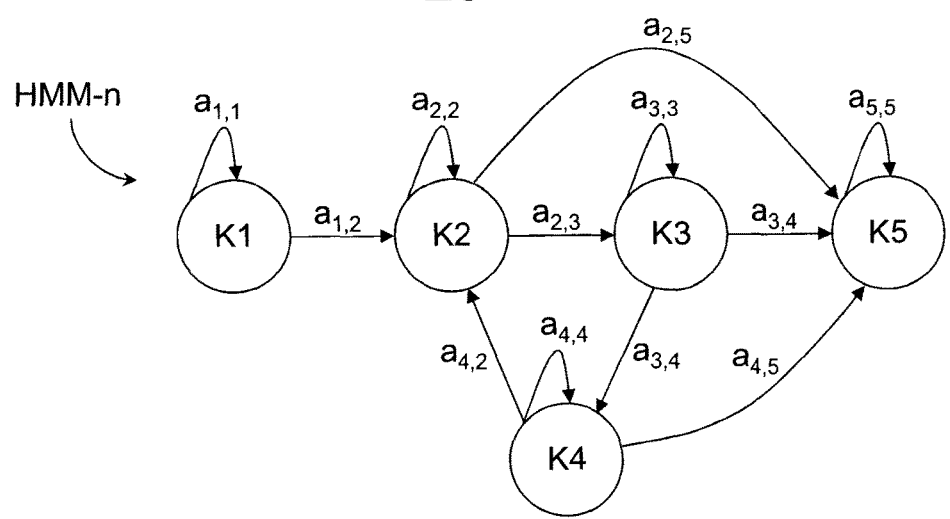
Figure 3:
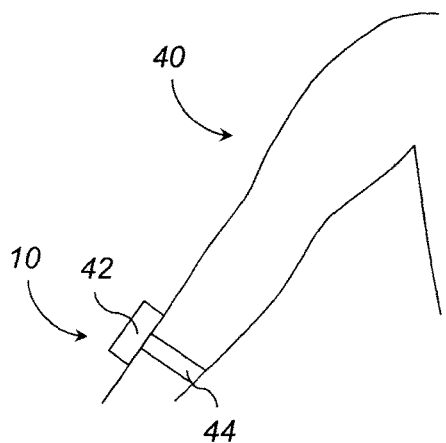
Figure 5:
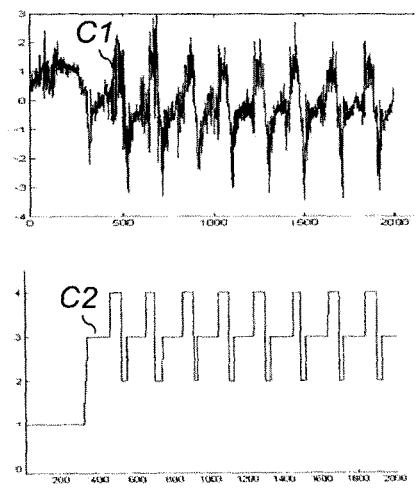
Figure 4:
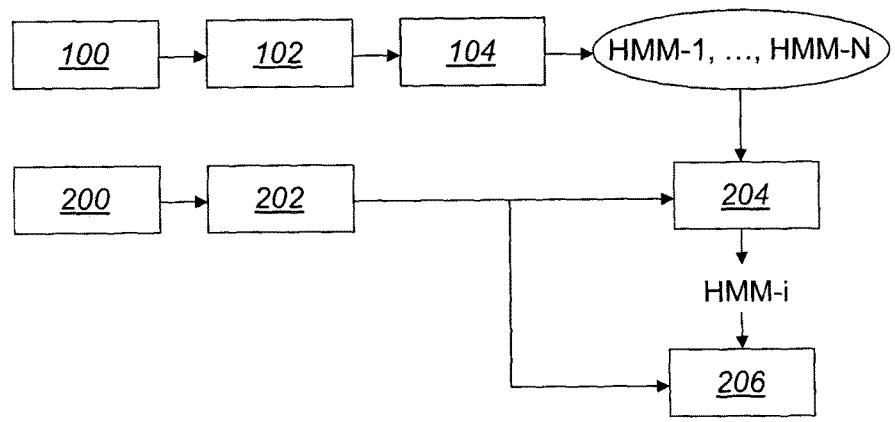

The invention will be easier to understand in view of the following description, provided solely as an example and with reference to the appended drawings, wherein:

FIG. 1 diagrammatically shows the general structure of an identification device according to an embodiment of the invention, FIG. 2 shows an example of a statistical hidden-state Markov model having transition constraints between hidden states forming a cycle and capable of being taken into account by the identification device of FIG. 1, FIG. 3 shows a specific use of the identification device of FIG. 1, FIG. 4 shows the successive steps of an identification method implemented by the device of FIG. 1, and FIG. 5 shows, by means of a diagram, a result of the identification method of FIG. 4 obtained on the basis of a statistical cyclic model such as that of FIG. 2.

The device 10 shown in FIG. 1 is a device for identifying a cyclic movement among a set of possible cyclic movements of a physical system observed by at least one movement sensor. It comprises, to this end, an observation module 12, a processing module 14 and an interface module 16.

The observation module 12 comprises one or more sensors represented by the single reference 18 for observation of the physical system.

In a non-limiting manner, some examples of sensors and situations capable of being observed using these sensors are provided:

the sensor 18 may, for example, comprise a movement sensor with one, two or three axes of measurement, in particular a 3D accelerometer worn by a person, for identifying a cyclic movement of this person, for example in the context of a walking, running or swimming activity performed by this person, more generally, it may comprise a movement sensor for determining the activity of a mobile system in a set of possible repetitive or cyclic activities, the movement sensor may comprise an accelerometer, a gyrometer or a magnetometer, etc.

The sensor 18 may also comprise a plurality of sensors each providing observations that, combined, make it possible to envisage detecting more complex cyclic movements.

It performs measurements on the physical system to provide at least one observation signal, transmitted in the form of observation data sequences, called observation sequences, to the processing module 14. The observation data may come directly from a sampling of the observation signal or be obtained after one or more processing operations, in particular one or more filterings, of this signal. It is thus understood that the observation data may be single- or multi-valued, including when there is only one sensor 18.

The processing module 14 is an electronic circuit, for example of a computer. It comprises storage means 20, for example a RAM, ROM memory or the like, in which the parameters of a plurality of statistical hidden-state Markov models are stored.

Each cyclic movement S-1, . . . , S-N intended to be detectable by the detection device 10 by means of the sensor 18 is modeled by a corresponding statistical hidden-state Markov model denoted HMM-1, . . . , HMM-N. For example, if the cyclic movement to be identified is a swimming stroke, a first model HMM-1 may correspond to breast stroke, a second model HMM-2 may correspond to freestyle, a third model HMM-3 may correspond to backstroke, and so on.

Any one of the stored statistical hidden-state Markov models, denoted HMM-n and modeling the cyclic movement S-n, is defined by the following parameters:

Cn, the number of hidden states of this model HMM-n, $\pi_1, \ldots, \pi_{C_n}$, Cn initial probabilities, independent of any observation, of each hidden state of this model HMM-n, $(a_{i,j})_{1 \le i, j \le C_n}$, the matrix of the probabilities of transition of each hidden state i to each other hidden state j of this model HMM-n, and for each hidden state, the parameters of a probability distribution of the observation provided at each instant by the sensor.

As a non-limiting example, and to simplify the notations, the probability distribution of each hidden state i of the model HMM-n may be chosen from the family of normal distributions. In this case, it is defined by its expected value $\mu n_i$ and its variance $\Sigma n_i$. When the data provided by the sensor 18 is multi-valued, $\mu n_i$ is a vector comprising as many components and $\Sigma n_i$ is a matrix comprising as many rows and columns as values provided at each instant.

In addition, some constraints may be imposed in the statistical model, HMM-n, in particular constraints associated with the transitions $a_{i,j}$ from one hidden state to another, some of which may be forbidden. Thus, if the Cn hidden states of the model HMM-n represent basic successive and ordered sub-movements, including at least one cycle characteristic of a repetitive or quasi-periodic cycle, the model HMM-n may itself be cyclic.

An example of a cyclic model HMM-n with three cyclic hidden states K2, K3, K4 and five hidden states in all K1 to K5 is shown in FIG. 2. It is suitable for modeling a physical activity of a person, capable of being detected by an accelerometric sensor, with most of these activities being periodic or quasi-periodic. For example, walking or swimming consists of series of sub-movements, respectively, of the limbs and the head, which are repeated. The first state K1 represents the engagement of the periodic or quasi-periodic activity considered (for example, a push off the side of a pool in the case of swimming), three successive states K2, K3 and K4 represent the periodic or quasi-periodic phase of the actual activity, and state K5 represents the end or the exiting of the activity.

Thus, the parameters of this corresponding Markov model with five hidden states are constrained as follows:

$\pi_1=1$, $\pi_2=0$, $\pi_3=0$, $\pi_4=0$, $\pi_5=0$, (the activity considered necessarily begins with its engagement phase), $\forall$ i,j $a_{i,j}=0$, excluding $a_{1,1}=1-\epsilon_1$, $a_{1,2}=\epsilon_1$, $a_{2,2}=1-\epsilon_2-\delta_2$, $a_{2,3}=\epsilon_2$, $a_{2,5}=\delta_2$, $a_{3,3}=1-\epsilon_3-\delta_3$, $a_{3,4}=\epsilon_3$, $a_{3,5}=\delta_{6,3}$, $a_{4,4}=1-\epsilon_4-\delta_4$, $a_{4,2}=\epsilon_4$, $a_{4,5}=\delta_4$, $a_{5,5}=1$.

More generally, a cyclic model HMM-n with Cn hidden states of which Cn-2 are cyclic is constrained as follows:

$\pi_1=1$, $\forall$ i>1 $\pi_i=0$, $\forall$ i,j $a_{i,j}=0$, excluding:

$a_{1,1}=1-\epsilon_1$, $a_{1,2}=\epsilon_1$, where $\epsilon_1 \in ]0,1[$, $\forall$ i, $1<i<(Cn-1)$: $a_{i,i}=1-\epsilon_i-\delta_i$, $a_{i,i+1}=\epsilon_i$, $a_{i,Cn}=\delta_i$, where $\epsilon_i,\delta_i \in ]0,1[^2$ and $\epsilon_i+\delta_i \leq 1$, $a_{Cn-1,Cn-1}=1-\epsilon_{Cn-1}-\delta_{Cn-1}$, $a_{Cn-1,2}=\epsilon_{Cn-1}$, $a_{Cn-1,Cn}=\delta_{Cn-1}$, $a_{Cn,Cn}=1$, where $\epsilon_{Cn-1}, \delta_{Cn-1} \in ]0,1[^2$ and $\epsilon_{Cn-1}+\delta_{Cn-1} \leq 1$.

As a practical example, based on the sensor used and its position, breast stroke swimming could be represented by a cyclic model with five cyclic hidden states (K2, K3, K4, K5, K6), an engagement state (K1) upstream of the cycle and an exit state (K7) downstream of the cycle. Each state of the cycle would correspond to one of the following five successive sub-movements of breast stroke:

K2: arms stretched forward, hands horizontal, joined and thumbs together; the head is underwater, tucked under the arms, facing downward; the swimmer is in the exhalation phase, K3: the arms move apart broadly, the palms are directed outwardly, the fingers are closed, to form a 45° angle with respect to the head/foot axis; toward the end of the movement, the palms are directed downward, to facilitate the emergence of the head and shoulders from the water, K4: the arms perform their return phase at the chest level, K5: at the end of the return, the hands again join, the head emerges from the water, the swimmer inhales very quickly, and K6: return to state K2: the bent arms begin to extend, the hands are joined; the head moves below the arms, and the chin is tucked in.

The memory 20 may also store, in association with each model HMM-n, one or more learning sequences L-n. Each learning sequence of the model HMM-n is in fact an observation sequence provided by the sensor 18, but it is known that it has been extracted from the observation of the physical system as it reproduced the cyclic movement S-n.

The constitution of a database of learning sequences can, for example, be obtained by executing an observation method as described in patent application FR 2 943 554. It may also be obtained empirically.

A learning sequence L-n can be processed upon receipt by the processing module 14, or stored in the memory 20 associated with the model HMM-n for subsequent processing, for a configuration or reconfiguration of the identification device 10 by updating parameters of the model HMM-n, as is, for example, described in detail in the French patent application published under number FR 2 964 223.

The processing module 14 also comprises a computer 22, for example a central processing unit equipped with a microprocessor 24 and a space for storing at least one computer program 26. This computer 22, and more specifically the microprocessor 24, is connected to the sensor 18 and to the memory 20.

The computer program 26 performs three main functions illustrated by modules 28, 30 and 32 in FIG. 1.

The first function, performed by the identification module 28, for example in the form of at least one instruction loop, is a function of identifying a cyclic movement reproduced by the physical system, upon receipt of an observation sequence O(0: M−1) provided by the sensor 18. This function will be described in detail in reference to FIG. 4.

More specifically, the identification module 28 comprises a first module 28A for identifying a type of cyclic movement among a plurality of possible types. This first module 28A is programmed to select one of the possible cyclic movements S-1, . . . , S-N by analysis of a compatibility of the observation sequence O(0: M−1) with each possible cyclic movement on the basis of the statistical model that is associated with this cyclic movement. This compatibility analysis comprises, for example, a comparison of probabilities associated with these possible cyclic movements, knowing the observation sequence, with the probabilities being estimated on the basis of stored statistical models HMM-1, . . . , HMM-N. The resolution of this selection by means of statistical hidden-state Markov models is well known and is part of the three major classes of problems solved by the hidden Markov models, as mentioned in the article of L. Rabiner, entitled "A tutorial on Hidden Markov Models and selected applications in speech recognition," Proceedings of the IEEE, vol. 77, no. 2, pp. 257-286, February 1989. It is the first class of problems mentioned in this article on page 261 and the resolution of which is described in detail on pages 262 and 263. According to this first class of problems, it is sought to compute the probability of obtaining the observation sequence O(0: M−1) for each possible cyclic movement, knowing the associated model, then the cyclic movement producing the highest probability is selected. For the cyclic movement S-n and by denoting X(0: M−1) any sequence of hidden states of the statistical model corresponding to S-n, this probability is written:

$$Pr_{S-n}(O(0: M-1)) = \sum_X Pr_{S-n}(O(0: M-1), X(0: M-1)) = \sum_X Pr_{S-n}(X(0))$$

$$Pr_{S-n}\left(O(0)|X(0)\right) \prod_{m=1}^{M-1} Pr_{S-n}(O(m)|X(m)) Pr_{S-n}(X(m)|X(m-1)),$$

this expression being capable of being simplified and computed by means of the known parameters of the corresponding Markov model.

Also more specifically, the identification module 28 comprises a second module 28B for time-based analysis of the cyclic movement selected by the first module 28A. This second module 28B is programmed to provide a sequence of hidden states X(0: M−1) of the statistical model associated with the selected cyclic movement, on the basis of the observation sequence and the statistical model associated with the selected cyclic movement. The resolution of this provision of a hidden state sequence X(0: M−1) by means of a statistical hidden-state Markov model is well known and is also part of the three major classes of problems solved by the hidden Markov models, as mentioned in the article of L. Rabiner cited above. It is the second class of problems mentioned in this article on page 261 and the resolution of which is described in detail on pages 263 and 264. According to this second class of problems, it is sought to provide the hidden state sequence X(0: M−1) corresponding best, according to a certain criterion of optimality, to the observation sequence X(0: M−1) knowing the statistical Markov model selected for this observation sequence. A plurality of solutions are known for the resolution of this second class of problems. One of them consists of applying the Viterbi algorithm as described in the article of L. Rabiner cited above. On the basis of the hidden state sequence provided in this way, also called a Viterbi path, the second time-based analysis module 28B is also programmed to compute statistical or counting parameters. For example, in consideration of the cyclic character of the statistical hidden-state Markov models HMM-1, . . . , HMM-N, these statistical or counting parameters may comprise a number of hidden-state cycles in the hidden-state sequence provided, the durations of each cycle, an average of the durations of each cycle, a variance of the durations of each cycle, a duration of a break in a cycle, and so on. The study of these statistical or counting parameters resulting from the Viterbi path then makes it possible to obtain a more precise identification of the cyclic movement identified. In the case of swimming, it is thus possible, for example, to determine whether it is performed competitively or recreationally, regularly or not, with or without errors, and with or without breaks.

The second function, performed by the recording module 30, for example in the form of an instruction loop, is a function of recording, in the memory 20, an observation sequence associated with one of the possible cyclic movements S-1, . . . , S-N. This observation sequence then becomes a learning sequence to be used to configure or reconfigure the identification device 10.

The third function, performed by the configuration module 32, for example in the form of an instruction loop, is a function of configuring the identification device 10 by updating parameters of at least one statistical model HMM-n stored in the memory by means of a learning sequence or a corresponding set of learning sequences L-n. An embodiment of this function is, for example, described in the patent application FR 2 964 223 and will not be described in detail. It may, however, advantageously be adapted according to specific constraints imposed by the cyclic models.

To select which function the processing module 14 must perform, the interface module 16 may comprise a mode selector 34 controlled by a user, in particular the person wearing the identification device 10 him or herself, when the physical system observed is a person.

In a simple embodiment, it may be considered that the identification device 10 functions by default in identification mode, thus executing the identification module 28.

On command by the user via the mode selector 34, the identification device 10 can momentarily switch to recording mode when an observation sequence associated with a known cyclic movement reproduced by the observed physical system is provided by the sensor 18 and must be recorded as a learning sequence in the memory 20. The identification device can then comprise a recording interface 36, whereby the user defines the observation sequence (for example, by marking its start and finish) and associates it with one of the possible cyclic movements. The recording interface 36 can comprise, in a traditional manner, a screen and/or data entry means.

Also on command by the user via the mode selector 34, the identification device 10 can momentarily switch to configuration mode, when the user considers there to be enough learning sequences in the memory 20 to enhance the adaptation of the detection device 10 to the physical system observed.

It should be noted that the observation 12, processing 14 and interface 16 modules are structurally separable. Thus, the identification device 10 can be designed in the form of a single piece or a plurality of distinct physical elements connected to one another by wired or wireless data transmission means. In particular, the processing 14 and optionally the interface 16 modules can be implemented by computer. Only the observation module 12 is necessarily in the vicinity or even in contact with the physical system observed since it comprises the sensor(s).

In FIG. 3, a particularly compact embodiment is shown, for an application in identifying a cyclic movement of a person 40. According to this embodiment, the identification device 10 is entirely integrated in a housing 42 worn by the person. The sensor is, for example, a 3D accelerometer and the cyclic movements observed are, for example, swimming strokes. For such an application in identifying different swimming strokes (breast stroke, freestyle, etc.), the housing 42 is, for example, securely held on an arm of the person 40 by means of a bracelet 44, so that the detection device 10 is worn as a watch. Alternatively (not shown), the housing 42 may be held on the forehead of a person 40 by means of a headband. Finally, for an application in identifying walking, long-distance running or sprinting, the housing 42 may be held on one of the legs of the person 40.

FIG. 4 shows the successive steps of a method for configuring the device 10 and for identifying observation sequences by means of the device 10 once configured.

In a first step 100, a learning sequence database is developed. It may be developed by executing the recording module 30 and/or by executing an observation method as described in the patent application FR 2 943 554. In this database, a learning sequence is in fact an observation sequence associated with one of the possible cyclic movements S-1, . . . , S-N.

As indicated above, the data of an observation sequence may be the direct result of a sampling of the observation signal provided by the sensor 18 or obtained after one or more processing operations, in particular one or more filterings, of this signal. If an additional processing operation is deemed necessary on any observation sequence before it is checked against the statistical cyclic models HMM-1, . . . , HMM-N, in particular in order to extract a sequence of specific characteristics, then this additional processing operation may be executed by the computer 22 in an optional step 102.

Then, in a step 104, the device 10 is configured or reconfigured by means of the learning sequence database. The execution of this step will not be described in detail. As indicated above, this may be done by adapting the teaching disclosed in the patent application FR 2 964 223. Alternatively, this step can also be executed in an empirical and non-reconfigurable manner. The statistical cyclic models HMM-1, . . . , HMM-N are thus updated and exploitable.

Steps 100 to 104 described above enable the identification device 10 to be configured so as to make it operational and can be reiterated as often as desired.

The actual identification method implemented by the device 10, and even more precisely by its identification module 28, comprises a step 200 of receiving, by the computer 22 of the processing module 14, an observation sequence concerning the physical system, provided by the sensor 18.

If an additional processing operation is deemed necessary on the observation sequence received in order to check it against the statistical cyclic models HMM-1, . . . , HMM-N, in particular in order to extract a sequence of specific characteristics therefrom, then this additional processing operation may be executed by the computer 22 in an optional step 202 identical to step 102.

Then, in a step 204 executed by the first module 28A of the identification module 28, the compatibility of the observation sequence with each statistical cyclic model HMM-n is estimated, as indicated above in the description of the first module 28A. The statistical cyclic model HMM-i maximizing the computed probabilities is selected and the corresponding cyclic movement is identified.

Finally, in a step 206 executed by the second module 28B of the identification module 28, on the basis of the statistical cyclic model HMM-i selected in the preceding step, the hidden state sequence best representing the observation sequence is computed and provided at the output of the computer 22, as indicated above in the description of the second module 28B, i.e. by applying the Viterbi algorithm as described in the article of L. Rabiner cited above.

In consideration of the cycle constraints imposed in the statistical cyclic model HMM-i selected, the hidden-state sequence obtained reproduces these constraints and thus characterizes in detail the sequence of sub-movements of the identified cyclic movement. It may then be displayed on a screen, for example a screen of the identification device 10 if it comprises one, and be statistically analyzed. In particular, statistical or counting parameters as mentioned above may be evaluated and optionally displayed.

FIG. 5 shows the assignment of hidden states to the samples of a sequence of observation of a cyclic activity such as swimming, on the basis of a cyclic model selected by the identification device 10 (step 204) in an engagement state (state 1) and three cyclic states (states 2, 3 and 4) as in FIG. 2. The observation sequence sampled is illustrated by curve C1, while the corresponding Viterbi path, provided by the identification device 10 (step 206), is illustrated by curve C2. The statistical analysis of the Viterbi path C2 makes it possible to analyze its cycle irregularities, their number, their rapidity, and so on.

It clearly appears that an identification device as described above enables an identification and a detailed analysis of the cyclic movements reproduced by an observed physical system. In particular, the provision of the Viterbi path associated with an observation sequence of which the cyclic movement that it reproduces has been identified makes it possible to obtain, simply and with enough precision, the time-based and statistical analysis of the sub-movements of this identified movement.

It should also be noted that the invention is not limited to the embodiments described above.

In particular, the detection device can be designed in very diverse forms since its observation 12, processing 14 and interface 16 modules are separable. Its design can thus be adapted to the envisaged application and to the physical system observed.

It will appear more generally to a person skilled in the art that various modifications can be made to the embodiments described above, in light of the teaching disclosed. In the claims below, the terms used must not be interpreted as limiting the claims to the embodiments disclosed in the present description, but must be interpreted as including all equivalents that the claims are intended to cover, in view of their wording, and that are within the reach of a person skilled in the art applying his or her general knowledge to the implementation of the teaching disclosed.

The invention claimed is:

1. A device for identifying a type of cyclic movement among a set of possible types of cyclic movements of a physical system observed by at least one movement sensor, comprising:
   at least one movement sensor for providing a sequence of observation data concerning the physical system;
   a memory that stores multiple statistical hidden-state Markov models;
   processing circuitry, connected to the sensor and to the memory, programmed to analyze a sequence of observation data and select one of the possible types of cyclic movements on the basis of the stored statistical hidden-state Markov models;
   wherein
   the memory comprises multiple statistical hidden-state Markov models, each corresponding to a possible type of cyclic movement and each of the possible types of cyclic movements having at least one corresponding statistical hidden-state Markov model;
   the processing circuitry is further programmed to analyze a compatibility of the observation data sequence with each possible type of cyclic movement on the basis of the at least one statistical hidden-state Markov model that is associated with this type of cyclic movement; and
   the processing circuitry is further programmed to provide a sequence of hidden states of the statistical hidden-state Markov model associated with the selected type of cyclic movement, on the basis of the observation data sequence and the statistical hidden-state Markov model associated with the selected type of cyclic movement.

2. The identification device as claimed in claim 1, wherein each statistical hidden-state Markov model associated with a possible type of cyclic movement is a cyclic model represented by a directed graph in which a directed cycle of hidden states is imposed.

3. The identification device as claimed in claim 1, wherein each hidden state of each statistical hidden-state Markov model of the memory corresponds to a predetermined sub-movement type of the type of cyclic movement with which this statistical hidden-state Markov model is associated.

4. The identification device as claimed in claim 2, wherein, for each statistical hidden-state Markov model:
   a first hidden state corresponding to a sub-movement type for starting the type of cyclic movement with which this statistical hidden-state Markov model is associated is represented by a node of the corresponding directed graph located upstream of the directed cycle; and
   a hidden state corresponding to a sub-movement type for stopping the type of cyclic movement with which this statistical hidden-state Markov model is associated is represented by a node of the corresponding directed graph located downstream of the directed cycle.

5. A method for identifying a type of cyclic movement among a set of possible types of cyclic movements of a physical system observed by at least one sensor, comprising:
   reception of a sequence of observation data concerning the physical system, provided by at least one sensor;

selection by a computer of one of the possible types of cyclic movements by analysis of the observation data sequence on the basis of multiple statistical hidden-state Markov models stored in a memory;

wherein multiple statistical hidden-state Markov models, each corresponding to a possible type of cyclic movement and each of the possible types of cyclic movements having at least one corresponding statistical hidden-state Markov model, are stored in the memory;

wherein the selection is made by analysis of a compatibility of the observation data sequence with each possible type of cyclic movement on the basis of the statistical hidden-state Markov model associated with this type of cyclic movement;

the method further comprising provision of a sequence of hidden states of the statistical hidden-state Markov model associated with the selected type of cyclic movement, on the basis of the observation data sequence and the statistical hidden-state Markov model associated with the selected type of cyclic movement.

6. The identification method according to claim 5, wherein the selection comprises a comparison of probabilities related to possible types of cyclic movements, knowing the observation data sequence, with the probabilities being estimated on the basis of the stored statistical hidden-state Markov models.

7. The identification method according to claim 5, wherein the provision of the hidden state sequence is performed by applying the Viterbi algorithm.

8. The identification method according to claim 5, further comprising computation of statistical or counting parameters of the provided hidden-state sequence.

9. The identification method according to claim 8, wherein, each statistical hidden-state Markov model associated with a possible type of cyclic movement being a cyclic model in which a directed cycle of hidden states is imposed, the computed statistical or counting parameters comprise at least one element of a number of hidden-state cycles in the provided hidden-state sequence, durations of each cycle, an average of the durations of each cycle, a variance of the durations of each cycle, and a duration of a break in a cycle.

10. A non-transitory computer readable medium including a computer program executed by a processor, and comprising instructions for executing the identification method according to claim 5, when the program is executed on a computer.

* * * * *